March 7, 1967  O. F. SHALLENBERGER  3,307,443
APPARATUS FOR DISPLAYING COLORED LIGHT
Filed Dec. 3, 1964  6 Sheets-Sheet 1
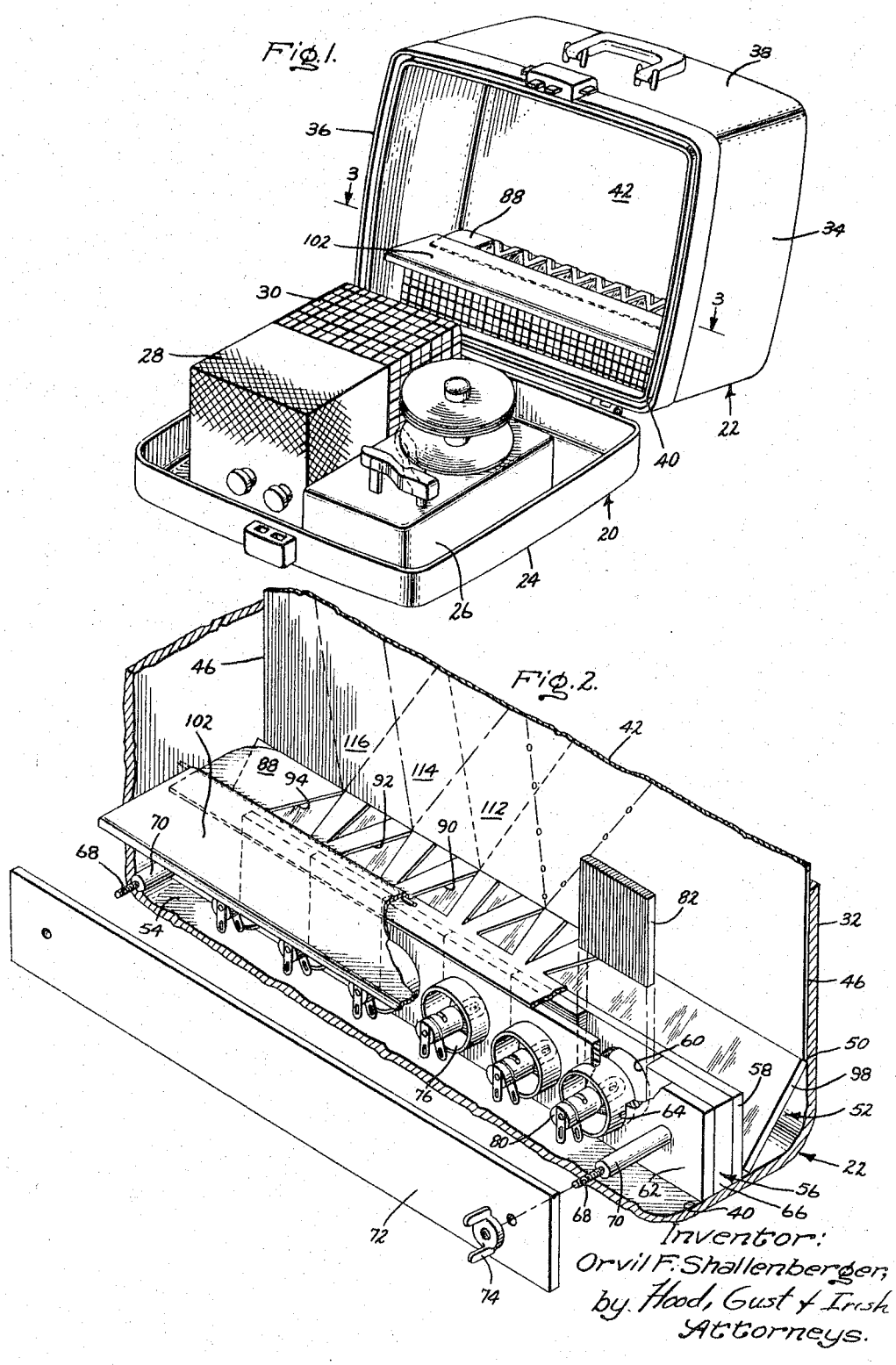
Inventor:
Orvil F. Shallenberger,
by Hood, Gust & Irish
Attorneys.

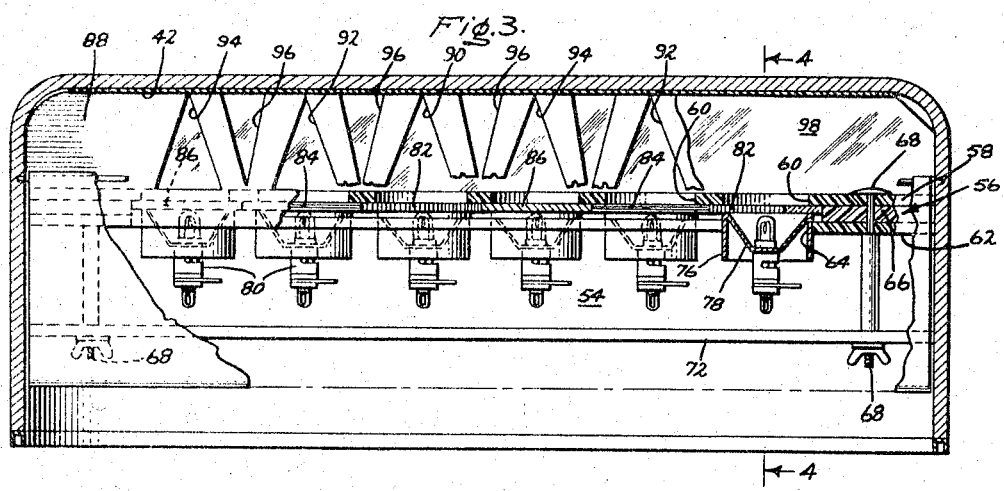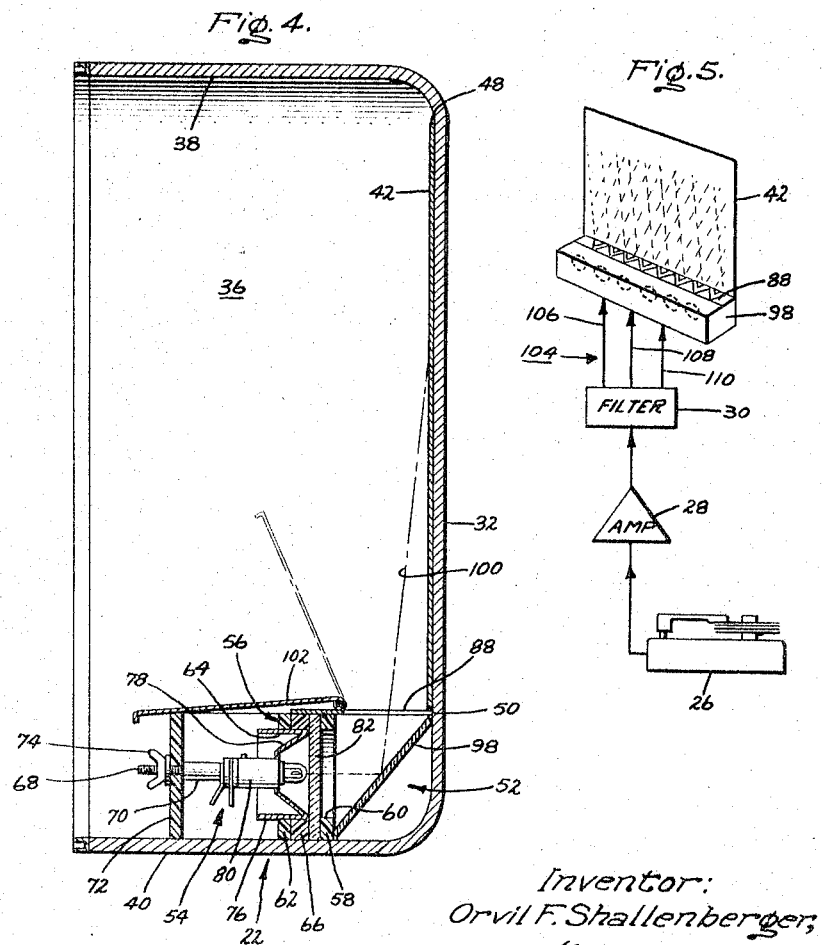

March 7, 1967     O. F. SHALLENBERGER     3,307,443
APPARATUS FOR DISPLAYING COLORED LIGHT
Filed Dec. 3, 1964     6 Sheets-Sheet 3
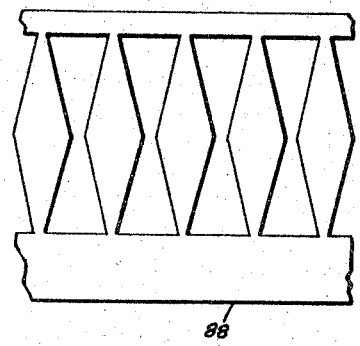
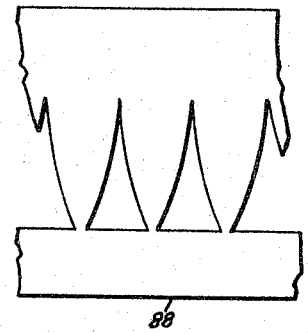
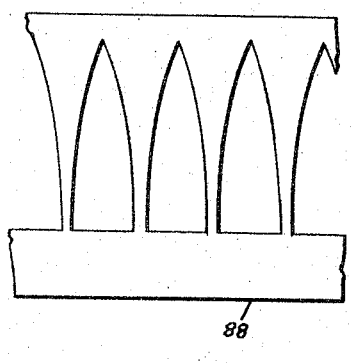
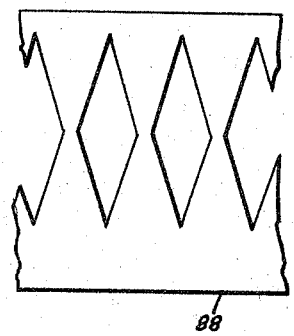
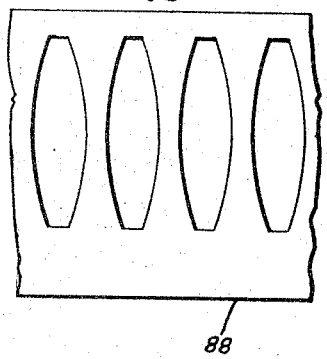
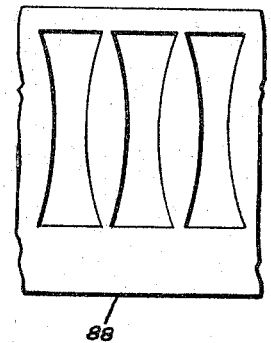
Inventor:
Orvil F. Shallenberger,
by Hood, Gust & Irish
Attorneys March 7, 1967 O. F. SHALLENBERGER 3,307,443
APPARATUS FOR DISPLAYING COLORED LIGHT
Filed Dec. 3, 1964 6 Sheets-Sheet 4

Inventor:
Orvil F. Shallenberger,
by Hood, Gust & Irish
Attorneys.

March 7, 1967 O. F. SHALLENBERGER 3,307,443
APPARATUS FOR DISPLAYING COLORED LIGHT
Filed Dec. 3, 1964 6 Sheets-Sheet 5
FIG_14
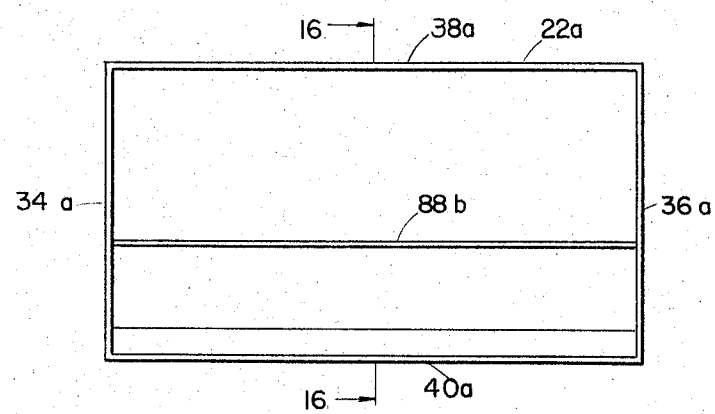
FIG_15
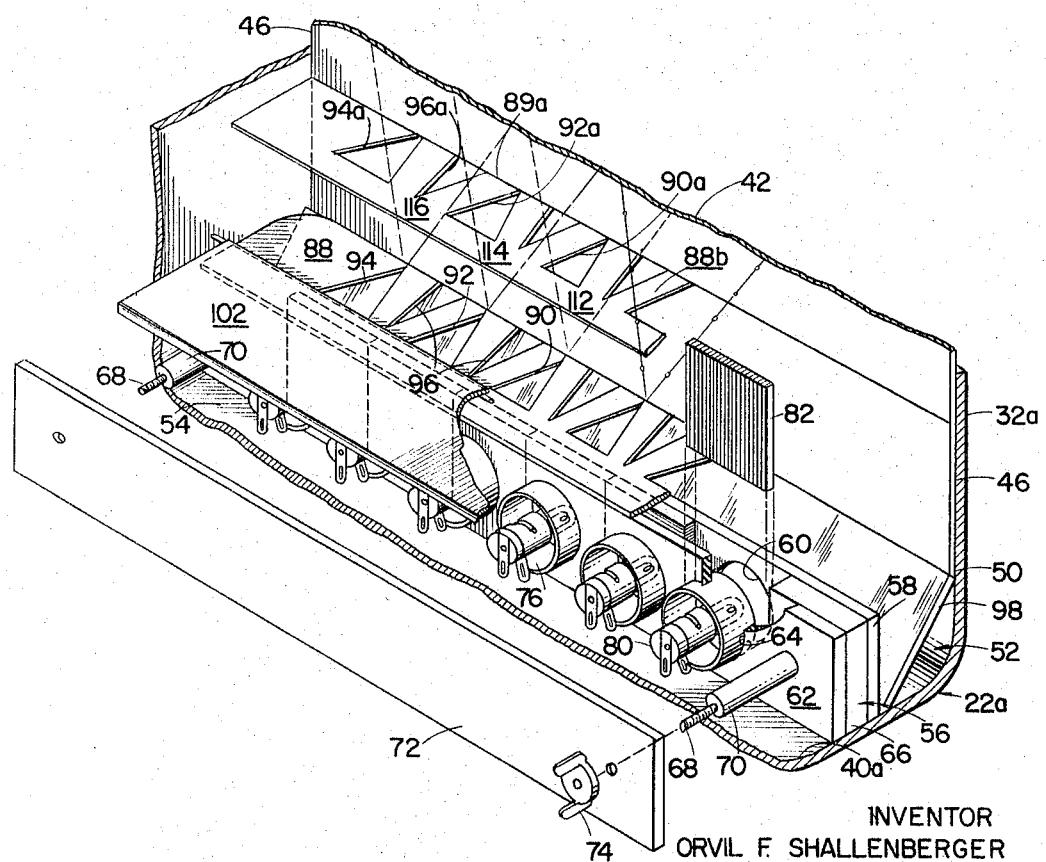
INVENTOR
ORVIL F. SHALLENBERGER
BY Hood, Gust & Irish
ATTORNEYS

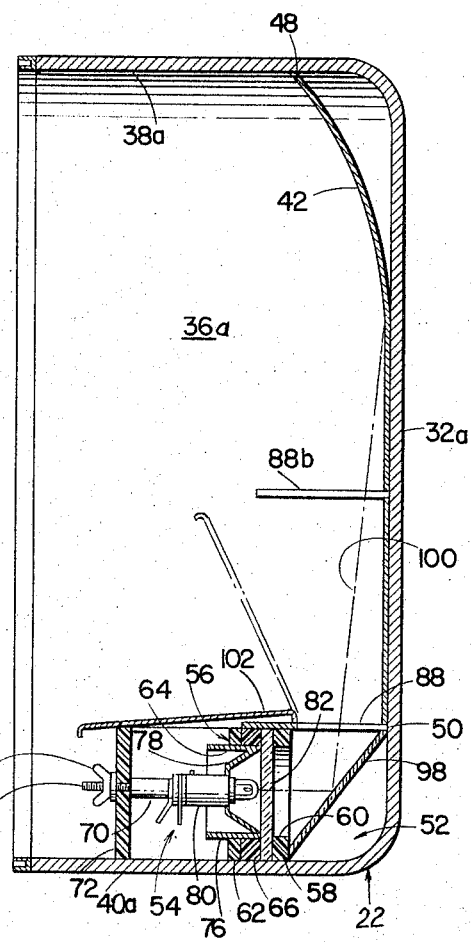

United States Patent Office 3,307,443
Patented Mar. 7, 1967

3,307,443
APPARATUS FOR DISPLAYING COLORED LIGHT
Orvil F. Shallenberger, 2512 Cle Elum Drive, Fort
Wayne, Ind. 46809
Filed Dec. 3, 1964, Ser. No. 415,636
7 Claims. (Cl. 84—464)

This application is a continuation-in-part of application Serial No. 107,082, filed May 2, 1961, now U.S. Patent No. 3,164,053.

The present invention relates to apparatus for displaying colored light and more particularly to such apparatus which is uniquely compact but yet displays a variety of colored lights in an interesting and dynamic display.

Colored light displays have been provided in the past wherein electronic apparatus controlled the energization of electric lamps in accordance with the generation of particular audio frequencies. In such arrangements, a plurality of different colored light sources have been coupled to an electronic frequency discriminator or filter which, in turn, was fed by amplified audio signals which emanated from a signal generator. Such a generator may be an ordinary electric phonograph or the like.

In this invention, electric signals corresponding to the audio frequencies of music are fed from a phonograph to an amplifier and then to an electric filter which functions to divide the total audio frequency spectrum into three or more different frequency channels which in turn are coupled to various colored light sources. If the light sources are considered to be green, red and blue, respectively, and the three output channels of the electric filter to be respectively connected thereto, then a band of frequencies passed by one of the channels will serve to energize one of the light sources. If a variety of frequencies are fed into the filter, and these frequencies vary among the three different selected bands, the light sources may be flashed "on" and "off" in accordance with the frequencies originally generated. Thus, the total apparatus may be considered to be a transducer whereby audio frequencies are converted into corresponding, different colored lights.

It is an object of this present invention to provide a compact apparatus capable of producing a colored light pattern on a display screen.

It is another object of this invention to provide an apparatus for projecting a variety of colored light onto a display screen at a low incident angle for producing a unique and interesting pattern of colors.

It is yet another object of this invention to provide an apparatus for projecting a colored light pattern onto a display screen, colored light being directed onto the screen at a low incident angle in such a manner as to permit making the apparatus the ultimate in compactness.

It is a further object of this invention to provide a colored light display apparatus which is capable of being combined with a portable phonograph or the like in such a manner as to require only negligible space over that normally occupied by the phonograph itself.

It is still further an object of this invention to provide an apparatus for projecting a colored light pattern onto a display screen, colored light being directed onto the screen at a low incident angle in such a manner as to permit the colored light to be masked in a unique manner so as to produce a unique and interesting pattern of colors.

Other objects will become more apparent as the description proceeds.

The abovementioned and other features and objects of this invention and the manner of attaining them will become more apparent and the invention itself will be best understood by reference to the following description of an embodiment of the invention taken in conjunction with the accompanying drawings, wherein:

FIG. 1 is a perspective illustration of one embodiment of this invention wherein the carrying case is shown open, readying the apparatus for operation;

FIG. 2 is an enlarged, fragmentary sectional illustration, partially broken away for clarity, of the light sources and masking element used in the embodiment of FIG. 1;

FIG. 3 is a sectional illustration taken along the section line 3—3 of FIG. 1;

FIG. 4 is a sectional illustration taken along the section line 4—4 of FIG. 3;

FIG. 5 is a schematic diagram illustrating in block form the electrical circuitry used in combination with the colored light display apparatus;

Figure 12:
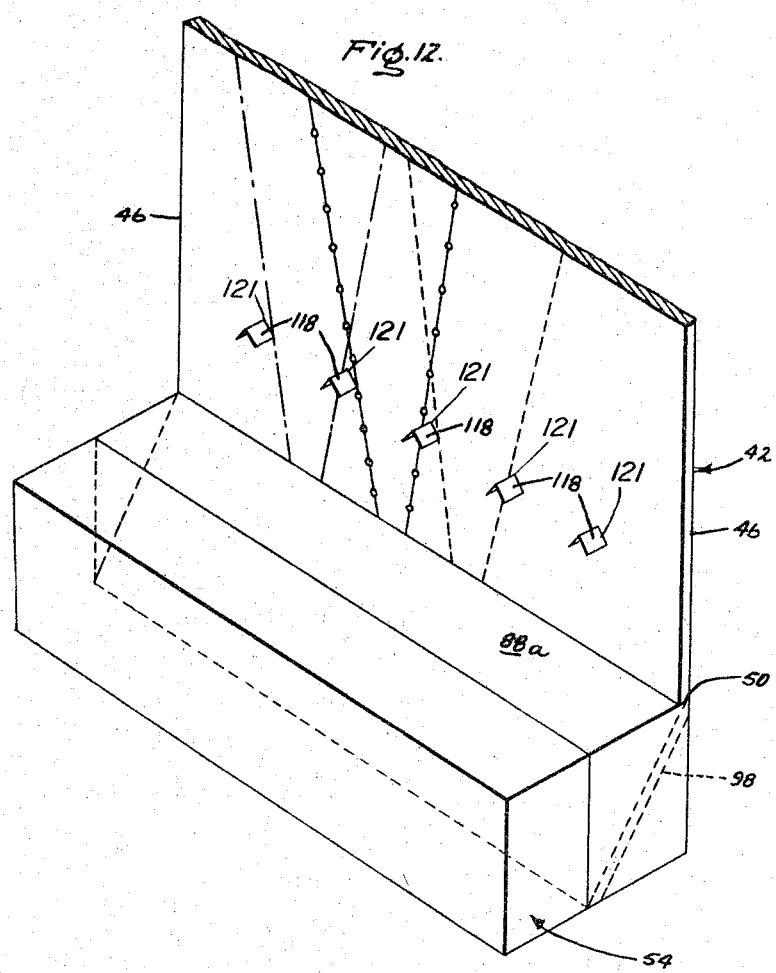
Figure 13:
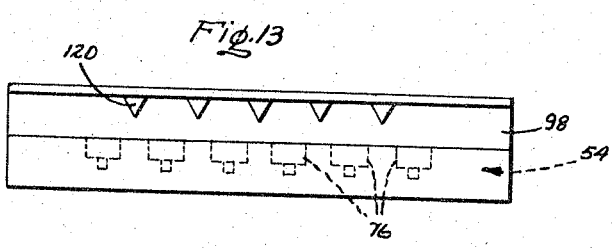

FIGS. 6 through 11 inclusive are fragmentary illustrations of various mask element shapes which are used in rendering different light displays;

FIG. 12 is a perspective illustration of another embodiment of this invention;

FIG. 13 is a top plan view of still another embodiment of this invention;

FIG. 14 is a front view of still another embodiment of this invention;

FIG. 15 is an enlarged, fragmentary sectional illustration, partially broken away for clarity, of the light sources and masking elements used in the embodiment of this invention shown in FIG. 14; and FIG. 16 is a sectional illustration taken along the section line 16—16 of FIG. 14.

Referring to the drawings, and more particularly to FIG. 1, the illustrated embodiment of the invention comprises a carrying case generally indicated by the reference numeral 20 having a cover 22 which is hingedly mounted thereon. In the base portion 24 of the carrying case is mounted a phonograph 26, an audio amplifier 28, and an audio frequency filter 30. These components 26, 28 and 30 are conventional and will be explained in somewhat more detail hereinafter.

The cover 22 of the carrying case is conventional, having a back wall 32 (FIG. 2), two side walls 34 and 36, respectively, and top and bottom walls 38 and 40, respectively. In the cover 22 is mounted the light display apparatus which comprises a display screen 42, which preferably is fabricated of a flat stiff supporting member having the front surface thereof painted white, or otherwise beaded, so as to display and reflect light which may be projected thereon. This screen 42 may be constructed the same as ordinary motion picture projection screen.

This screen is made of such size as to cover the interior of the back wall 32, the opposite lateral edges 46 of the screen being disposed contiguous with the cover sidewalls 34 and 36, respectively. The top edge 48 of the screen terminates just short of the top wall 32 while the bottom edge 50 of the screen terminates a short distance above the bottom walls 40, as shown more clearly in FIG. 4. The screen 42 is secured to the cover back wall 32 by means of glue, staples or the like.

In the bottom portion of the cover 22 is positioned the light source and masking mechanism which comprises a compartment generally indicated by the reference numeral 52 and a chamber generally indicated by the numeral 54. A partition assembly generally indicated by the numeral 56 extending the full width of the cover 22 separates the compartment 52 from the chamber 54 and is composed of flat strips of sheet stock of plastic, plywood, metal or the like. As shown more clearly in FIGS. 2, 3 and 4, this partition assembly 56 comprises a rear strip 58 having a plurality of longitudinally spaced openings 60 therein and a front strip 62 which is also provided with an equal number of longitudinally spaced openings 64 in registry with the openings 60. These two strips 58 and 62 are held apart by a pair of spacer blocks 66 located at the opposite ends of the assembly. The two strips 58 and 62 and the spacer blocks 66 are secured together in rigid assembly by means of two through bolts 68 at the opposite ends thereof which receive over the shanks thereof a pair of spacer sleeves 70, respectively.

The chamber 54 is defined along the front thereof by a wall 72 which receives the through bolts 68 therethrough. The wall 72 is abutted on its inner side by the ends of the two spacers 70 and on the outer side by the nuts 74 which are turned down tightly enough to secure rigidly the wall 72 in place as well as to clamp the partition assembly 56 together.

In each of the openings 64 in the partition strip 62 is mounted a tubular member or supporting sleeve 76 which is secured in place by either a friction fit, glusing or the like. In each of the sleeves 76 is fixedly mounted a bowl-shaped light reflector 78, this reflector preferably being of parabolic shape which will provide a divergent beam of light. Inside each reflector 78 is mounted a lamp or bulb 80, the light-emitting portion extending into the reflector 78 so as to provide the divergent beam just mentioned.

In registry with the opening pairs 60, 64 and in between the partition strips 58 and 62 are mounted a plurality of colored, glass windows 82, 84 and 86 which are red, blue and green, respectively, in one embodiment of this invention. Note in FIG. 3 that there are two sets of such windows extending across the entire width of the cover 22. These glass windows 82, 84, 86 in combination with the respective bulbs 80 are referred to in certain of the claims hereafter as "colored light sources." It will appear obvious to persons skilled in the art that other structures capable of emitting colored light may be used without departing from this invention, and it is intended that the term "colored light sources" include these equivalent alternative structures.

The top portion of the compartment 52 is covered by a masking element 88 which is fabricated of some suitable sheet material such as cardboard, metal or wood. This masking element is provided with a first set of longitudinally arranged and spaced apertures 90, 92 and 94 which are optically aligned with the colored windows 82, 84 and 86, respectively, already described. In between these apertures 90, 92 and 94 is a second set of apertures 96. As shown in FIG. 3, these apertures have particular shapes, the apertures 90, 92 and 94 being wedge-shaped with the apices contiguous with the display screen 42 and the remaining apertures 96 also being wedge-shaped but with the apices thereof being adjacent to the partition assembly 56. Preferably, the masking element 88 lies in a plane which is normal to the plane of the display screen 42.

Mounted in the compartment 52 is a mirror 98 which is set at an angle to incline downwardly and away from the bottom edge 50 of the display screen 42. This mirror 98 is optically aligned with the respective windows 82, 84 and 86 such that the beams of light produced by the light sources 78, 80 will be reflected upwardly through the masking apertures 90, 92, 94, 96 along the path 100 which intersects the display screen 42 at an acute or low incident angle. As will now be apparent, the mirror 98 serves to reflect the divergent light beam emitted by the sources 78, 80 upwardly onto the display screen 42.

For the purpose of covering the chamber 54, a cover 102 is hingedly mounted between the side walls 34 and 36 of the cover 22. This cover 102 may be swung to an open position as shown in FIG. 4 for the purpose of gaining access to the light sources 78, 80. The components hereinabove described which define compartment 52 and chamber 54 may be referred to hereafter in certain claims as forming a "housing."

In a preferred embodiment of this invention, the light sources 78, 80 are electrically connected to a composite output circuit 104 of the conventional audio frequency filter 30. The phonograph 26 is connected to an audio amplifier 28 which in turn is connected to the input circuit of the filter 30. The filter 30 divides the audio spectrum into three different frequency output channels of, for example, sixty (60) to one thousand (1,000) cycles, one thousand (1,000) to five thousand (5,000) cycles, and five thousand (5,000) to ten thousand (10,000) cycles, respectively. These channels are identified in FIG. 5, respectively, by the numerals 106, 108, and 110. Channel 106, for example, is connected to the light sources 78, 80 which are associated with the red windows 82. The second channel 108 is connected to the light sources 78, 80 which are in registry with the colored windows 84. Thirdly, the channel 110 is connected to the light sources 78, 80 which are aligned with the colored windows 86. Thus, the respective light sources will be energized selectively by signals appearing in the respective channels 106, 108 and 110.

In operation, the carrying case 20 is opened to the position shown in FIG. 1. In this position, the display screen 42 is positioned upright so that it may be readily observed. The phonograph 26 playing a conventional record generates audio frequencies which are amplified by the amplifier 28 and fed to the filter 30. The filter 30 in turn segregates the various audio frequencies as converted to corresponding electrical signals into the three separate channels 106, 108 and 110, these signals in turn being coupled to the various light sources 78, 80. If it is momentarily assumed that the phonograph is emitting electrical signals corresponding to the entire audio frequency spectrum, it will be noted that all three channels 106, 108, and 110 will energize the respective light sources 78, 80. This being true, the entire bank of light sources will be energized so as to emit red, blue and green light, simultaneously. If it is next assumed that the phonograph 26 is emitting signals only in the sixty to one-thousand (60 to 1,000) cycle range, only the channel 106 of the filter 30 will have signals appearing therein, thereby resulting in the energization of the red light sources 78, 80 only. Simultaneously, the light sources 78, 80 associated with the colored windows 84 and 86 will be extinguished.

As a third possibility, if it is assumed that the phonograph 26 is emitting signals in the two bands of one thousand to five thousand (1,000 to 5,000) cycles and five thousand to ten thousand (5,000 to 10,000) cycles, only the light sources 78, 80 associated with the windows 84 and 86 will be energized, the light source associated with the window 82 being extinguished. Thus, it will appear that as the frequency of the music played by the phonograph 26 changes, the various light sources 78, 80 will be correspondingly energized and extinguished in flashing sequence.

As explained earlier, the mirror 98 in the compartment 52 reflects the light energized by the light sources 78, 80 upwardly onto the display screen 42 at an acute or low incident angle. This light is passed through the various apertures in the masking element 88 thereby providing a pattern of displayed light on the screen 42. Since the apertures 90, 92 and 94 are wedge-shaped, the pattern of light developed from each onto the display screen 42 will be correspondingly wedge-shaped so as to spread from an apex adjacent to the lower screen edge 50 upwardly into a corresponding wedge shape. In FIG. 2 is illustrated exemplary wedge shapes of colored lights as indicated by the reference numerals 112, 114 and 116, respectively. These displayed wedges overlap as shown, thereby providing a mixing of the red, green and blue colors in these overlapping areas.

As will now be apparent, each of the wedges 112, 114 and 116, have the individual color red, blue and green, respectively. As the wedges overlap, a mixing or blending of these colors will result, thereby providing an artful and attractive display of colors. With music being played on the phonograph 26, these various, displayed wedges will flash "on" and "off" such that a constantly varying color pattern of light will be displayed on the screen 42.

Since the angle at which the light impinges the screen 42 is indeed small as illustrated in FIG. 4, the light passed by the various masking apertures will strike the screen 42 adjacent the bottom edge 50 thereof and will extend upwardly to the top edge 48. This results in the entire screen 42 being illuminated with the display of constantly varying colors.

As will be seen more clearly in FIG. 3, the wedges 90, 92 and 94 which account for the displayed color patterns 112, 114 and 116, respectively, are optically aligned with the colored windows 82, 84 and 86. This leaves the reverse shaped apertures 96 as being positioned in between the various colored windows 82, 84 and 86. As previously explained, the light sources 78, 80 produce divergent beams, respectively, and this being the case, the fringe portions of the respective beams will be reflected by the mirror 98 upwardly at an angle through the apertures 96. This results in some illumination of the areas of the screen 42 not covered by the primary color wedges 112, 114 and 116 since these apertures 96 are not in optical alignment with the respective light sources, it is seen that the light passed thereby and which falls on the screen 42 can be mixed to provide a further fanciful and artful display of moving colors on the screen.

The structure as thus far described is so arranged as to be uniquely compact for fitting into the cover 22 of an ordinary phonograph carrying case. The longitudinal arrangement of the various light sources permits the display of a multiplicity of different colors onto a display screen of extended area which is fully open for observation. Additionally, since the apparatus is mounted in the cover 22, the walls 34, 36, 38 and 40 thereof provide a light shield which renders the colored display more visible. In other words, ambient light is shielded from the display screen 42.

The low incident angle 100 as viewed in FIG. 4 of the displayed light is important, since it permits the structure of the light sources to be contained in a small, compact structure and further permits the display of the light over a large extended area.

While the masking element 88 has been illustrated and described in connection with FIGS. 1 through 4 inclusive as being wedge-shaped, different, unique patterns of light may be developed by different aperture shapes as illustrated by the various mask elements 88 appearing in FIGS. 6 through 11 respectively.

Reference is now made to FIG. 12 wherein another embodiment of the invention is illustrated. Like numerals indicate like parts. For the parts shown, the structure is identical with that shown in FIG. 2 with the exception that the mask element 88 is entirely eliminated. On the display screen 42 adjacent to the lower edge thereof I have mounted a plurality of elongated shields 118 which are V-shaped in cross-section. These shields 118 are mounted at one end 121 on the front side of the display screen 42 as shown and project forwardly into the path of the light beams which are angled upwardly from the mirror 98 onto to display screen 42. The shields 118 are arranged in a row extending parallel to the elongated opening 88a and are spaced apart in vertical alignment with the spaces between the light sources 76 as shown in FIG. 2. In other words, the light sources 76 are vertically aligned with the spaces between the respective shields 118.

In operation, light from the respective sources 76 is reflected upwardly by the mirror 98 onto the front face of the display screen 42, a portion of this light being intercepted by the respective shields 118. The resulting display on the display screen is therefore rendered colorful, interesting and unique by reason of the mixed wedge-shaped patterns of different colored light produced by reason of the presence of the various shields 118.

In FIG. 13 is illustrated still another form of the present invention. Like parts indicate like numerals, and the structure is identical to that of FIG. 12 with the exception that the shields 118 are replaced by flat triangular masking elements 120 which are attached to the front side of the screen 42 in the same geometrical arrangement as already described in connection with the shields 118 of FIG. 12. In operation, these masking elements 120 serve essentially the same purpose as the shields 118; however, a slightly different pattern of light is displayed on the screen 42 by reason of the particular shapes of the elements 120.

Referring now to FIGS. 14, 15 and 16, there is illustrated still another form of the present invention. In this embodiment, the structure is identical to that shown in FIGS. 2, 3 and 4 as indicated by the like reference numerals which are assigned to like parts with the exception of three modifications. The first modification consists of curving the screen 42 adjacent end 48 such that the curvature of the screen 42 can be defined geometrically by a plurality of substantially identical curves drawn in a family of planes which intersect the bottom edge 50 of the screen 42 and the back wall 32 perpendicularly. In operation, the screen 42 is curved to a degree such that the light from the respective sources 78, 80 reflected upwardly by the mirror 98 and onto the display screen 42 is substantially of the same intensity on the top portion of the screen 42 adjacent end 48 as it is at the bottom of the screen 42 adjacent end 50.

The second modification of the structure shown in FIGS. 1 through 4 which is incorporated in this last-mentioned embodiment of this invention is most clearly illustrated in FIG. 14, where there is shown a box 22a which is substituted for the cover 22 illustrated in FIG. 1. Box 22a has a back wall 32a (see FIG. 15), two opposite side walls 34a, 36a, respectively, and top and bottom walls 38a, 40a, respectively. In operation, the cover 22 and the box 22a are identical.

The third and final modification of this last-mentioned embodiment comprises a second sheet-like mask element 88b which is horizontally disposed in box 22a in general parallelism and a spaced-apart relationship with the mask element 88 of the first embodiment of this invention. As shown in FIG. 15, both the mask elements 88, 88b are used in this embodiment of this invention. Mask element 88b extends between the side walls 34a and 36a and has a longitudinal edge 89a which is contiguous to screen 42. Like element 88, the second mask element 88b has a plurality of apertures which are longitudinally arranged and spaced from each other. Apertures 90a, 92a and 94a, like the corresponding apertures, 90, 92, 94, are optically aligned with the colored windows 82, 84 and 86, respectively. In between these apertures 90a, 92a and 94a is a second set of apertures 96a. As shown in FIG. 15, these apertures have a particular shape, the apertures 90a, 92a and 94a being wedge-shaped with the apices contiguous to the display screen 42 and the remaining apertures 96a also being wedge-shaped but with the apices spaced-apart and remote from the screen 42. Finally, while masking element 88b has been illustrated and described in connection with FIGS. 14, 15 and 16 as being wedge-shaped, different, unique patterns of light may be developed by different aperture shapes as illustrated by the various mask elements 88, 88b, appearing in FIGS. 6 through 11, respectively. Again while mask elements 88, 88b have been described as being identical in connection with FIGS. 14, 15 and 16, they may be dissimilar and may have apertures of shapes appearing in FIGS. 6 through 11, respectively.

In operation, this last-described embodiment functions substantially identical to the embodiments above-described to produce a plurality of different colored divergent beams which are directed against mirror 98, through mask element 88 and onto the display screen 42 in such a manner that the beams will overlay each other and mix or diffuse thereby forming a plurality of rays of multi-colored and diffused light on the screen 42. However, the inclusion of the mask element 88b in the last-mentioned embodiment disrupts the colored light pattern formed by the afore-mentioned diffused light rays and produces a new and distinctly appearing colored light pattern intermediate the top 38a of the box 22a and the mask 88b. This new and distinctively appearing light pattern is produced by the afore-mentioned rays of multi-colored and diffused light impinging on the mask element 88b and being partially masked out so that only a portion of the rays pass through apertures therein thereby forming a plurality of diffused light means on the screen 42 which diverge and overlap and further diffuse together in a similar manner as afore-indicated by the wedge shapes of colored lights indicated at 112, 114 and 116 in FIG. 2. As is obvious from this description, however, the diffused light beams passing through mask element 88b will have a greater variety of colors than the light sources 78, 80 and will also include the colors of the sources 78, 80 and the colors formed therefrom by the afore-mentioned mixing.

While the light sources 78, 80 have been described hereinabove as being turned "on" and "off" or as being "energized" and "extinguished" by the phonograph 26, the light sources 78, 80 more accurately only vary in intensity. Therefore, the use of the words "on" and "off" and "energized" and "extinguished" herein is meant to describe the light sources 78, 80 varying in intensity from a low intensity glow to a high intensity beam in proportion to the intensity of the signals energizing the same while the phonograph 26 plays. Only when no energizing signal is present at all are the light sources 78, 80 ever actually off or extinguished.

While I have described above the principles of my invention in connection with specific apparatus, it is to be clearly understood that this description is made only by way of example and not as a limitation to the scope of my invention.

What is claimed is:

1. Apparatus for displaying colored light comprising an extended area display screen having opposite side edges, a plurality of colored light sources arranged in a row extending between said side edges, said row of light sources being disposed on one side of said display screen and adjacent thereto, means associated with said screen including a first plurality of masking elements for directing divergent beams of light onto said screen at an acute angle of incidence for producing a display on said screen of a plurality of wedge-shaped colored light patterns, a second plurality of masking elements interposed in said beams of light respectively for masking out portions of said beams, said second masking elements being arranged in a row parallel to the row of light sources, said second masking elements being mounted with respect to said screen and said light sources.

2. The apparatus of claim 1 wherein said masking elements are spaced-apart from each other and said light sources are individually arranged in optical alignment with the spaces between said masking elements.

3. An apparatus for displaying colored light comprising a box having a back wall and opposite side walls, an extended area display screen having a bottom edge mounted on said back wall and within said box, said screen being curved at a position spaced apart from said bottom edge in a manner defined geometrically by substantially identical curves drawn in planes substantially perpendicularly to said bottom edge and said back wall, a first sheet-like mask element horizontally disposed in said box and extending in a direction between said side walls, said first element having a first longitudinal edge adjacent to said bottom edge of said screen and having surfaces generally perpendicular to said back wall and side walls, said screen extending between and bounded by said first element and said side walls, said first element having a plurality of first apertures arranged in a row in said direction, an upright and translucent partition spaced from said back wall and extending between side walls in general parallelism with said screen, said partition depending from said first element, said partition having a plurality of spaced apart filter portions therein, a plurality of light sources disposed adjacent to said partition on the side thereof opposite said back wall, each of said filters having one of said light sources in register therewith, each of said filters having one of said light sources providing a divergent beam which projects through said partition within the area of one of said filters, an inclined mirror positioned in the space between said partition and said back wall and extending between said side walls, the angle of inclination of said mirror being such as to reflect said light beams upwardly and onto said screen at an acute angle of incidence with said screen, said reflected light from said mirror passing upwardly through said apertures of said first element before impinging on said screen, said beams from different of said sources overlaying and diffusing together thereby forming a plurality of rays of multi-colored and diffused light, and a second sheet-like mask element horizontally disposed in said box and having surfaces in general parallelism with said surfaces of said first element, said second element extending in said direction between said side walls and having a second longitudinal edge contiguous to said screen, said second element having a plurality of second apertures arranged in a row in said direction, said diffused light rays passing through said second apertures adjacent to said screen, thereby being formed into a plurality of diffused light beams, some of the diffused light beams having colors different from said light sources.

4. Apparatus of claim 3 wherein one set of said first and second apertures respectively are optically aligned with said sources such that one aperture has one source directly associated therewith, each of the aligned apertures being wedge-shaped with the apices thereof disposed adjacent to said screen, and a second set of said first and second apertures being wedge-shaped and interleaved with said one set of said first and second apertures, the apices of said second set being disposed remote from said screen.

5. The apparatus of claim 3 further comprising means for energizing said light sources, and means for selectively varying the energization of said light sources in response to varying audio frequencies.

6. Apparatus for displaying colored light comprising a box having opposite sides and a back wall, a display screen mounted on said back wall, first means positioned within said box and extending generally outwardly from said back wall for defining a plurality of first apertures arranged in a row extending from positions adjacent to and between said sides, a mirror positioned in said box beneath said first means and in registry with each of said first apertures, said mirror being inclined downwardly from said back wall, a plurality of light sources being mounted in said box in registry with said mirror and in optical registry with said first apertures, respectively, second means forming the light of said sources into a corresponding plurality of divergent beams, third means for filtering said beams thereby forming said beams into light of predetermined wave lengths, said mirror directing said beams onto said screen at an acuate angle of incidence, said beams from different of said light sources overlaying and diffusing together thereby forming a plurality of rays of multi-colored and diffused light, and fifth means positioned in said box intermediate the bounds of said screen and extending generally outwardly from said back wall and said screen for defining a plurality of second apertures, said diffused light rays passing through said second apertures adjacent to said screen thereby being formed into a plurality of diffused light beams, some of said diffused light beams having color different from said light sources.

7. An apparatus for displaying colored light comprising a box having a back wall and opposite side walls, a display screen mounted on said back wall, said screen being bounded by said side walls, a mirror secured to and extending between said side walls, said mirror being inclined downwardly and away from said back wall, a plurality of colored light sources mounted in said box and arranged in a row between said opposite sides and spaced from said mirror, means forming the light of said sources into a corresponding plurality of divergent beams and directing said beams against said mirror at an angle at which the beams reflected upwardly onto said screen at an acute angle with said screen, said beams from different of said sources overlapping and diffusing together thereby forming a plurality of rays of multi-colored and diffused light, at least one aperture-defining first element positioned within said box and extending outwardly from said screen and between said side walls, said first element being positioned intermediate the bounds of said screen and generally perpendicular to said side walls and defining a plurality of apertures therein, said diffused light rays passing through said apertures adjacent to said screen, thereby being formed into a plurality of diffused light beams, some of said diffused light beams having colors different from said light sources, and at least one aperture-defining second element positioned in said box intermediate said element and said means, said second element extending outwardly from said back wall and into said beams and defining a plurality of second apertures therein through which a portion of said beams can pass.

References Cited by the Examiner

UNITED STATES PATENTS

| | | | |
|---|---|---|---|
| 1,946,026 | 2/1934 | Lewis et al. | 84—464 |
| 1,973,454 | 9/1934 | Wilfred | 272—10 |
| 1,977,997 | 10/1934 | Patterson | 84—464 |
| 2,131,934 | 10/1938 | Burchfield | 84—464 |
| 2,285,535 | 6/1942 | Schlett | 40—106.54 |
| 3,048,075 | 8/1962 | Wright | 84—464 |
| 3,111,057 | 11/1963 | Cramer | 84—464 |
| 3,122,966 | 3/1964 | Butterfield | 84—464 X |
| 3,140,347 | 7/1964 | Cohen | 84—464 X |

RICHARD B. WILKINSON, *Primary Examiner.*
STEPHEN J. TOMSKY, *Examiner.*